Nov. 16, 1943.   E. P. HAWTHORNE   2,334,673
WHEEL
Filed Aug. 8, 1941
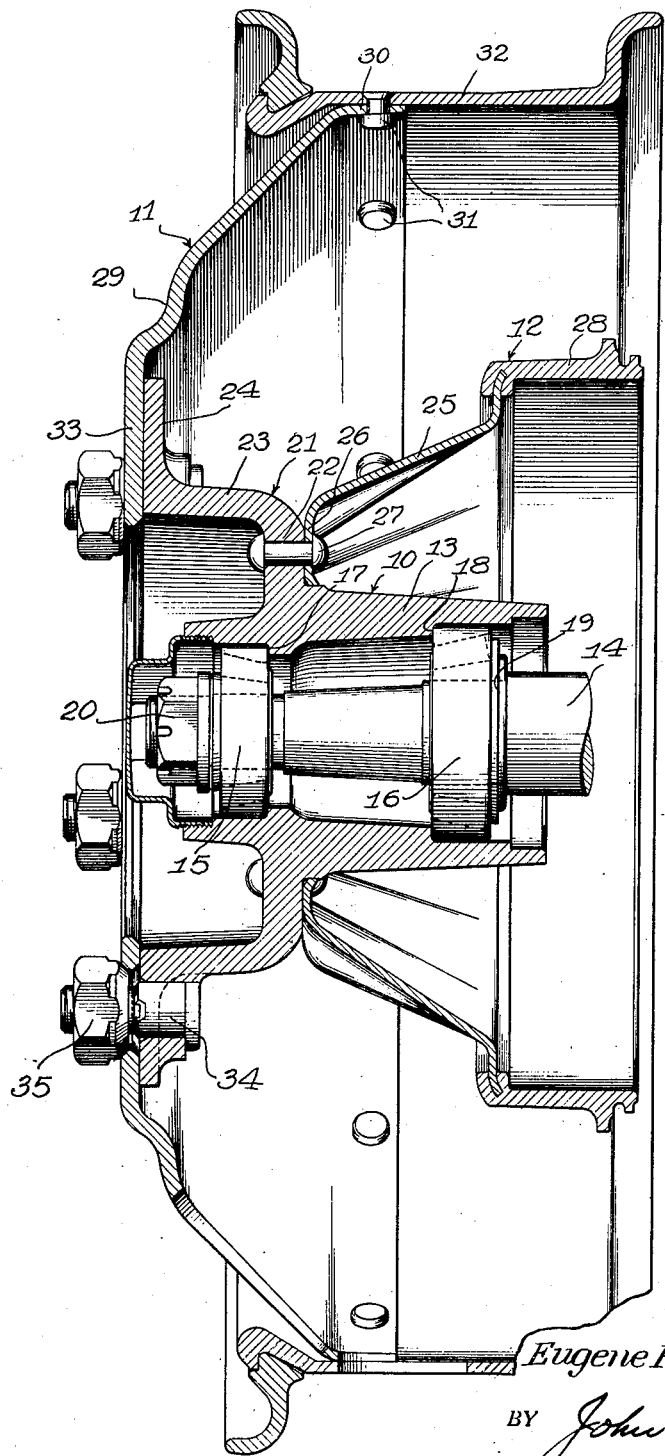
INVENTOR
*Eugene P. Hawthorne*
BY *John P. Darby*
ATTORNEY Patented Nov. 16, 1943

2,334,673

UNITED STATES PATENT OFFICE 2,334,673

WHEEL

Eugene P. Hawthorne, Detroit, Mich., assignor to Budd Wheel Company, Philadelphia, Pa., a corporation of Pennsylvania Application August 8, 1941, Serial No. 405,945

3 Claims. (Cl. 301—6)

The invention relates to wheels and more particularly to heavy-duty wheels, such as truck and bus wheels, equipped with a brake drum.

Such wheels usually have their bodies formed as deeply-dished discs having a radial bolting-on flange, the dishing permitting the proper spacing of the rims when the wheels are mounted as duals. To place less strain on the deeply-dished wheel bodies, it is desirable to make the bolting-on circle of large diameter, and it is also desirable to locate the hub flange-attaching portion outboard of the wheel, so that the tread of the wheel will be in proper relation to the hub proper. Under these conditions, favorable for the wheel proper, the brake drum, if secured to the same hub flange-attaching portion as the wheel proper, would have its head extend almost cylindrically and thus be more subject to distortion and, besides, would be difficult to draw if made, as is preferable, as sheet metal stamping. To avoid this, the wheel and brake drum have heretofore been mounted on separate hub flanges extending from the hub barrel. This, however, unduly complicates the formation of the hub and makes it impossible to form the hub as a forging, which is the strongest form of hub.

It is the object of the invention to overcome these difficulties and to provide a simple and strong construction, which at the same time is light in weight and can readily be manufactured at low cost. To attain this object, the hub of the wheel is formed so that a single securing flange serves to secure both the wheel body and brake drum thereto, the flange having radially outer and radially inner securing portions which are axially offset from each other, the radially outer one being furthest outboard of the wheel and serving to mount the wheel body, and the radially inner being inboard and serving to mount the brake drum. This arrangement permits the flange to emanate from the hub barrel intermediate its ends and facilitates the formation of the entire hub as a forging.

Other and further objects and advantages and the manner in which they are attained will become apparent from the following detailed description when read in connection with the drawing forming a part hereof.

In the drawing, the figure shows an axial section, parts being shown in elevation, of a wheel assembly according to the invention.

The hub of the wheel is generally designated 10, the demountable wheel by 11, and the brake drum by 12.

The hub consists of the barrel 13, which in this instance is shown as rotatably mounted on the axle 14, through roller bearings 15 and 16 insertable into the barrel from either end against shoulders 17 and 18, respectively, and held in place by an opposing shoulder 19 on the axle and the outer securing nut 20. Of course, if the hub barrel were associated with a driving axle, it would naturally be splined thereto to rotate therewith.

Intermediate the ends of the hub barrel, in this case just inward of the outboard bearing 15, emanates the securing flange of web-like form designated generally by numeral 21. This flange comprises a radially inner attaching portion 22 having an inboard attaching face against which the brake drum 12 is adapted to be secured.

The radially inner attaching portion is extended toward the outboard side of the wheel by a generally axially extending portion 23 which is illustrated as being of a length many times the thickness of the flange and which terminates in an outer radially extending portion 24 having an outboard face against which the wheel body 11 is adapted to be secured.

The wheel body and brake drum are thus adapted to be secured to the axially offset radially inner and outer portions of the hub flange.

The brake drum head 25 is a deeply-dished corrugated sheet metal disc having a radial securing flange 26 seated against the inboard face of the hub flange portion 22 and secured thereto as by a plurality of rivets 27. The drum proper may be a cast ring 28 in which the periphery of the head 25 is embedded. It is, of course, understood that the drum proper and head may be an integral cast construction or otherwise differ from the specific form shown.

The wheel body is shown of the demountable and interchangeable type, i. e., usable as either a single wheel body or in a set of duals on the same hub. It may comprise a deeply-dished tapered disc body 29 having an axial flange 30 at its periphery upon which is seated and secured, as by rivets 31, the rim 32. Around its central opening it is provided with a generally radially extending securing flange 33, through which it is secured, in known manner, as by a plurality of studs 34 and nuts 35, to the outboard face of the radially outer attaching portion 24 of the hub flange 21.

By this arrangement, it will be seen that the hub is of a form which facilitates its production as a forging, with the subsequent machining of the parts which require good fit. As a forging, it is stronger for a given weight than a casting.

The form of the hub flange not only facilitates its forging integrally with the hub barrel, but it also provides attaching portions for the wheel body and brake drum in the most desirable axial and radial locations for the attachment of these parts. The advantages of this arrangement are that it permits the manufacture of the entire ensemble with a minimum of cost and weight and, at the same time, permits its operation at a maximum of efficiency.

While a specific embodiment of the invention has been described, it will be understood that changes and modifications may be made by those skilled in the art from the precise construction disclosed herein, without departing from the spirit and scope of the appended claims.

What is claimed is:

1. A wheel assembly comprising a hub barrel having a single attaching flange of web-like form extending therefrom, said flange having radially inner and outer axially offset attaching portions interconnected by a generally axially extending portion, a brake drum secured to the radially inner of said portions and a wheel body secured to the radially outer of said portions.

2. A wheel assembly comprising a hub barrel having a single attaching flange of web-like form thereon emanating from the barrel intermediate its ends, said flange having a radially inner attaching portion and a radially outer attaching portion axially offset from the radially inner portion toward the outboard side of the wheel and interconnected by a generally axially extending portion, a brake drum having a dished head formed with a radial securing flange secured through said flange to the radially inner attaching portion of said hub flange, and a dished wheel body having a radial securing flange secured through said flange to the radially outer attaching portion of said hub flange.

3. A wheel hub having a hub barrel and a single wheel and brake drum securing flange of web-like form extending therefrom and having radially inner and outer portions axially offset from each other and providing substantially radial faces for securing, respectively, a brake drum and wheel, the axially offset portions being interconnected by a generally axially extending portion of a length many times the thickness of said flange.

EUGENE P. HAWTHORNE.